June 24, 1958  J. E. NAUTA  2,840,357
DEVICE FOR HOMOGENIZING POWDERY OR GRANULAR MATERIAL
Filed April 27, 1955  3 Sheets-Sheet 1

Inventor
JOHANNES EWARDUS NAUTA

June 24, 1958 J. E. NAUTA 2,840,357
DEVICE FOR HOMOGENIZING POWDERY OR GRANULAR MATERIAL
Filed April 27, 1955 3 Sheets-Sheet 3

INVENTOR
JOHANNES EWARDUS NAUTA
BY
ATTORNEY

United States Patent Office 2,840,357
Patented June 24, 1958

2,840,357

DEVICE FOR HOMOGENIZING POWDERY OR GRANULAR MATERIAL

Johannes Ewardus Nauta, Overveen, Netherlands

Application April 27, 1955, Serial No. 504,142

Claims priority, application Netherlands May 7, 1954

3 Claims. (Cl. 259—21)

This invention relates to a mixing device for homogenizing a quantity of powdery or granular material of the kind provided with one or more mixing members through which the material is carried in a stream along a wall of a vessel. Known devices of this kind either mix the material without exercising great forces, so that lumps present in the material are not pulverized, or, if of the kind that exerts a kneading action and is able to pulverize these lumps the device requires excessive power for its operation. The object of the invention is to provide a device which with a relative low powder consumption is able to convert all sorts of powdery or granular material, for example, material comprising lumps, into homogeneous masses. According to the invention, in a device of the kind mentioned above, an axle extending through the wall is coupled outside the vessel with a motor for rotation by the latter at great speed, and carries inside the vessel a homogenizing member in the shape of a disc provided with projections.

The invention will be explained with reference to the accompanying drawings, wherein.

Figure 1:
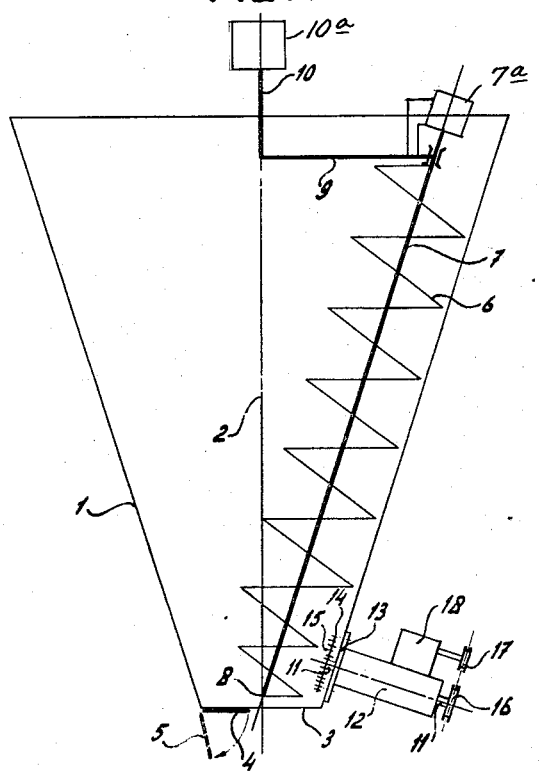
Fig. 1 is a diagrammatic view of a first embodiment of the invention, partly in side elevation and partly in vertical section.

Referring to Fig. 1, it will be seen that a device according to this invention includes a mixing vessel with a conical wall 1 tapering downwardly and a vertical centerline 2, and in which a flat bottom 3 of the vessel has an exhaust flap 4, the opened position of said flap is indicated at 5. In the vessel there is a conveyor screw 6 the blades of which are mounted on an axle 7. The axle 7 intersects the centerline 2 of the vessel at an angle which equals half the vertical angle of the cone of the wall 1 of the vessel.

The axle 7 is supported at its lower end by a universal joint or by a ball and socket joint at the point of intersection of its centerline with the centerline 2 of the vessel, as indicated at 8, so that the axle 7 can rotate about its centerline and, moreover, may be carried about the centerline 2 by a radial arm 9 which extends radially from an axle 10 coaxial with the centerline 2 and which rotatably supports the upper end of the axle 7. The arm 9 is revolved for example, with a speed of about 2 revolutions per minute by a motor 10a connected to the shaft or axle 10, while the axle 7 is rotated about its own axis for example, by a motor 7a mounted on the arm 9, at a speed which is greater, for example, 30 times greater, than the rotational speed of axle 10.

The axle 7 revolves in such a way that when material is present in the vessel, this material will be carried upwards by the screw 6. As the screw moves close along the wall, the material cannot withdraw anywhere from the influence of the mixing member and all the material passes, at a rather high speed, the narrow part of the vessel and the material will be carried along each part of the wall situated close to the bottom 3 of the vessel in only a few minutes, even in mixing vessels with a content of 1 m$_3$.

A shaft 11 extends through the wall 1 close to the bottom 3, and is supported in a case 12 fixed to the wall of the vessel by a flange 13. The shaft 11 carries, at the end situated inside the vessel, a disc 14 which at the side facing toward the interior of the vessel is provided with pins 15 extending parallel to the shaft 11. Some pins are also provided at the other side of the disc 14 so that when the shaft 11 rotates, the material will be flung away from the shaft 11 and consequently the escape of dust from the vessel around the shaft 11 will be avoided. The outer end of the shaft 11 carries a pulley 16. This pulley is coupled with a pulley 17 on an electric motor 18 by means of a belt. The motor 18 is mounted on the case 12.

When the motor 18 is switched on, the disc 14 rotates at a speed of, for example, 1000 revolutions per minute, so that lumps coming into contact with the pins 15 will be immediately broken up by the pins and the broken parts of a lump, which parts may be sticky, will be mixed with other material. The conveyor screw 6 ensures that the material at the spot of the disc 14 is never under high pressure, so that the disc 14 requires only a little power for its rotation, for example, only one twentieth of the power required for driving the screw 6. If homogenizing is effected by means of a kneading action, the total required power would amount to at least double the power required for the device according to the invention (for an equal quantity having to be prepared in the same time).

The device described above permits the addition of a quantity of liquid, for example, a small quantity of a vitamin-bearing oil, to a quantity of powdery material. If this is carried out by discharging oil in a thin stream or even as drops on top of the material, inevitably a number of big or small lumps is formed, which, however, will be scattered again homogeneously at least through the whole quantity of material by means of the disc 14.

The addition of a liquid on the top of the material has the drawback that the liquid before being finely divided may come into contact directly or indirectly with the wall of the vessel so that some material may adhere thereon and stay out of the reach of the disc 14. Therefore it is mostly preferred to supply the liquid in the proximity of the disc 14, which may be carried out by using another arrangement of the homogenizing member shown in Fig. 2.

Figure 2:
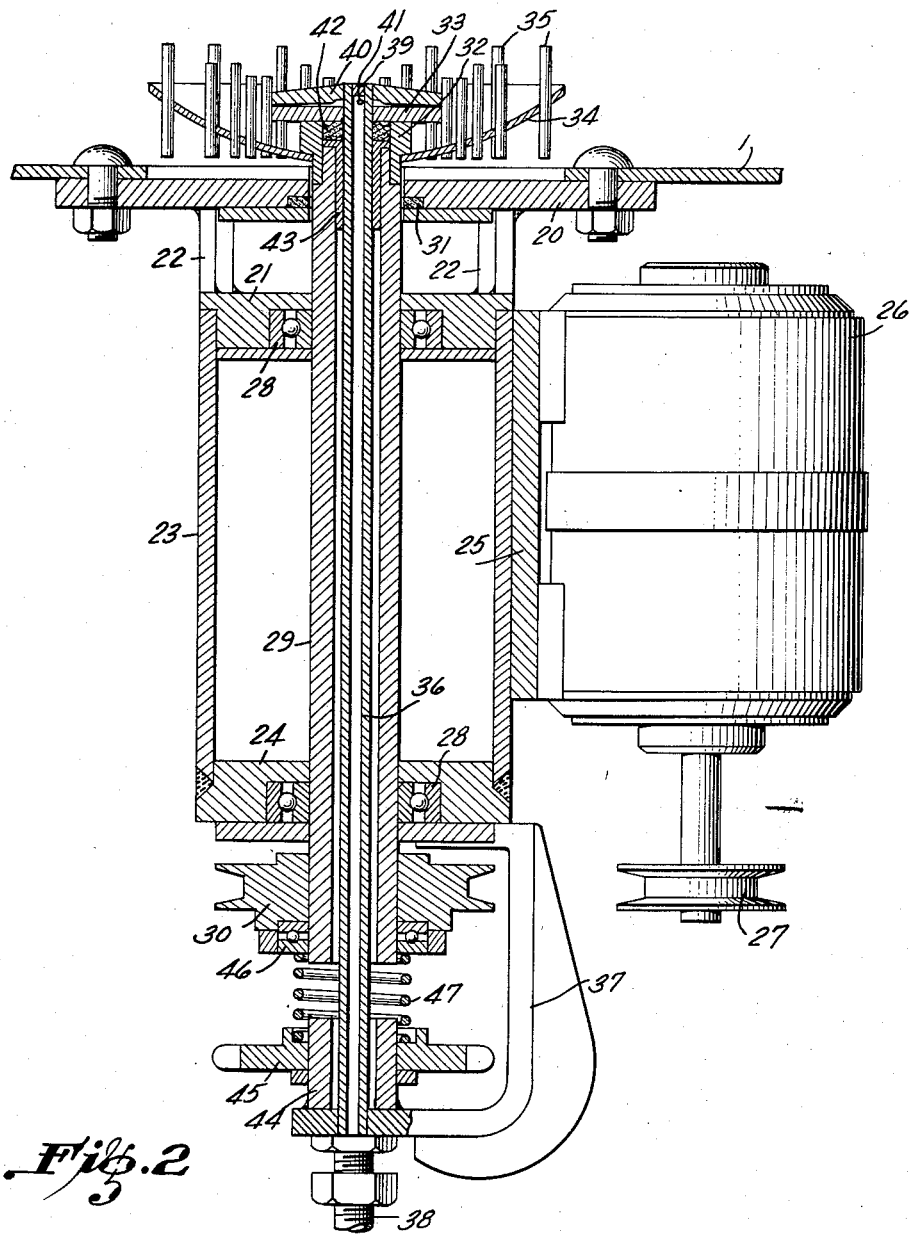
Fig. 2 is a sectional view of a modification of a part of the device shown in Fig. 1 by which modification the device becomes suitable for mixing liquid with the material.

In the embodiment of Fig. 2, a flange 20 is fixed against the wall 1 of the vessel. A ring 21 is connected to the flange 20 by means of supporting members 22 and is further connected with a similar ring 24 by means of a tube 23 which carries a plate 25 at one side on which an electric motor 26 is mounted. The free end of the shaft of motor 26 carries a pulley 27. The rings 21 and 24 each carry a ball bearing 28 for a hollow shaft 29, which, at the end adjacent the pulley 27 carries a pulley 30. A belt (not shown) runs around pulleys 27 and 30 so that the motor 26 may drive the shaft 29. The shaft 29 extends through the wall 1 and the flange 20 has a sealing ring 31 enclosed therein to prevent the leakage of material from the vessel along the shaft 29. The end of the shaft 29 extending inwardly through the wall of the vessel carries a box 32 having a perforated flat disc 33 fixed by means of screws across the inner side of the box. A basin-shaped disc 34 has a central aperture into which the box 32 extends until it abuts against a shoulder on the box 32 and the disc 34 is rigidly joined, as by welding, to this shoulder on the box 32. The disc 34 is provided with a number of holes receiving pins 35 which are rigidly joined to the disc in positions parallel to the shaft 29. In the proximity of the disc 33, the pins 35 are shorter than the pins adjacent the edge of the disc 34.

Further, a tube 36 extends through the hollow shaft 29 and has one of its ends arranged immovably with regard to the ring 24 by attachment to a bow 37 and also connected to a supply main or conduit 38 for liquid by means of a coupling. The other end of the tube 36 is closed by a stopper 39 and carries a disc 40 having the same diameter as the disc 33. The disc 39 is a little bit concave at the side thereof facing towards the disc 33. The space defined between the confronting sides of the discs 33 and 40 is in communication with the interior of the tube 36 by means of a radial opening 41 in the wall of said tube, so that liquid can leave the tube 36 between the discs 33 and 40. The escape of liquid through the space between the inner side of the hollow shaft 29 and the outer side of the tube 36 is prevented by means of a packing 42 which is enclosed between the disc 33 and a guide bushing 43 for the tube 36 which is secured against displacement in the shaft 29.

The bow 37 carries a cylindrical box 44 which is concentric with the tube 36 and provided with an external screw thread receiving a nut 45 in the form of a handwheel. Moreover, the shaft 29 carries a thrust ball bearing 46 resting, at one side, against the pulley 30, while a helical spring 47 is interposed between the other side of thrust bearing 46 and the nut 45. A desired pressure may be applied by the spring 47 by adjusting the nut or handwheel 45. The hollow shaft 29 is subjected to the pressure of the spring 47. The shaft 29 is slidable axially for a small distance in the bearings 28 so that the edge of the rotatable disc 33 will be pressed against the edge of the stationary disc 40 with a force determined by the adjusted pressure of the spring 47. The result being that when the pressure of the liquid supplied through the conduit 38 is less than a predetermined value, the slit between the discs 33 and 40 will be closed and consequently no material from the vessel can penetrate between the discs. However, when liquid is supplied under sufficient pressure through the tube 38 to overcome the pressure of the spring 47 and thereby move the disc 33 away from the disc 40 so that an open annular slit is defined between the peripheral edges of the discs 33 and 40, liquid will leave the slit in a film, the thickness of which is determined by the pressure of the spring 47. The higher the pressure of the spring 47, the higher the pressure of the liquid supplied through the tube 38 will have to be to effect discharge between the discs 33 and 40. The film of liquid discharged radially outward between the discs 33 and 40 hits the material coming into touch with the pins 35 which are closest to such discs. This material cannot stick together as it is immediately finely divided and mixed with a much greater quantity of material by means of the outer pins 35 when the motor 26 has been excited to rotate the shaft 29. Therefore the disc 34 ensures that the material coming in contact therewith is finely mixed, while the conveyor screw in the vessel ensures that the material will be mixed coarsely and uniformly brought into contact with the disc 34. By this cooperation a small quantity of liquid may be spread very homogeneously throughout the material within a short time, and this is of special importance if the liquid is expensive and the testing of the minimum content is severe.

It is to be understood that, although Fig. 1 indicates that the shaft 11 extends through the side wall of the vessel, it is in principle also possible to extend the shaft 11, or the shaft 29 of the device in Fig. 2, through the bottom of the mixing vessel, so that the disc 14 and the disc 34 will then lie in substantially horizontal planes.

The edges of the discs 33 and 40 will spread very thinly even a thick liquid. In case the liquid comprises grains which have to be pulverized, the edges of the discs 33 and 40 may also be provided with fine furrows for obtaining a grinding action as a result of the rotation of the disc 33 rotating with shaft 29 relative to the non-rotatable disc 40. The device described with reference to Fig. 1 is also very suitable for supplying or mixing a gas, for example, air, with the powdery material. Supplying air simply through an opening in the vessel filled with powder is difficult, because bubbles are formed which escape at the surface of the powdery material and cause whirling of dust. In the device according to the invention this inconvenience is greatly reduced.

Although the mixing device represented in Fig. 1 constitutes the most favorable form for use in connection with a device according to the invention, as concerns speed, power consumption and safety, in principle it is possible to incorporate the homogenizing device embodying this invention in other mixing devices which are operative to carry the material to be mixed past the homogenizing device.

Figure 3:
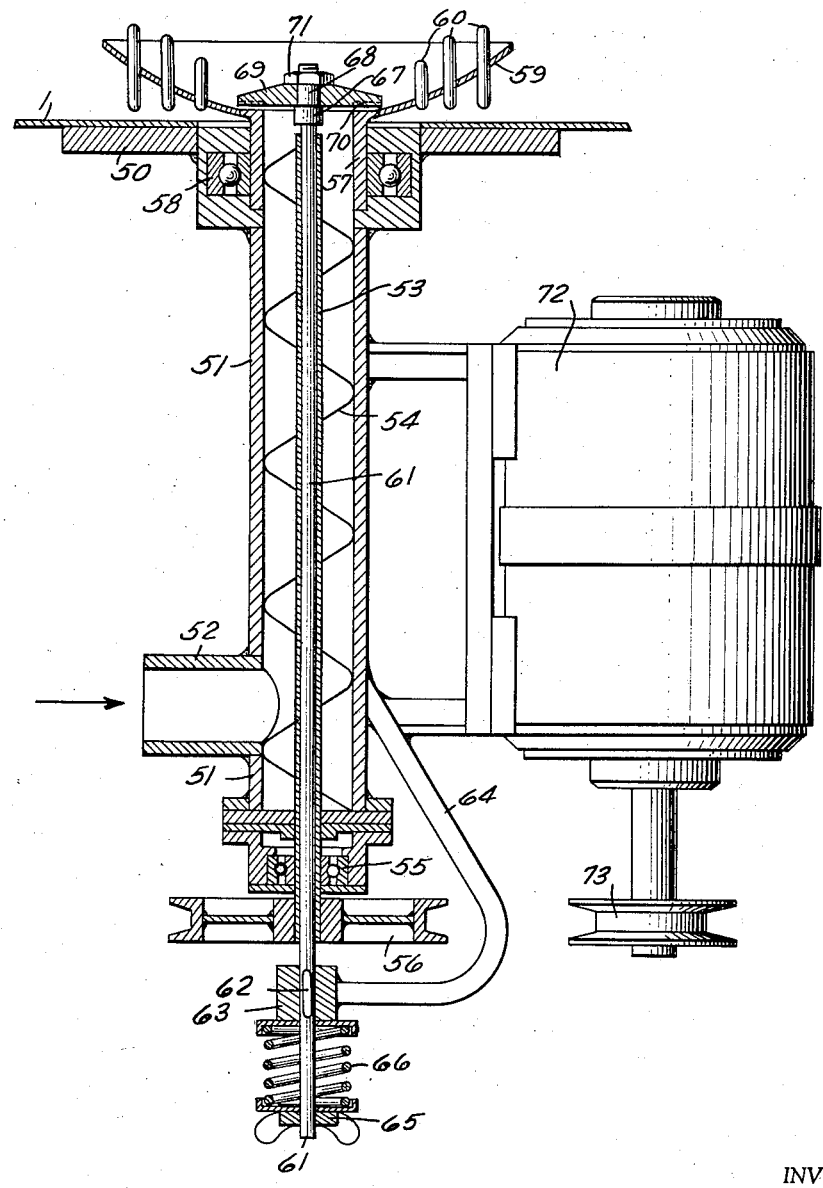
Fig. 3 is a sectional view of another modification of the same part of the device shown in Fig. 1 by which modification the device becomes suitable for mixing a powdery substance with the material present in the mixing vessel.

When a homogenizing device according to Fig. 3 is used in a mixing device of the kind shown in Fig. 1, to permit the addition of a powdery material, the homogenizing device is preferably mounted against a wall which is more or less upright, for example, the wall 1 in Fig. 1. The device according to Fig. 3 is fixed against the wall 1 by a flange 50. The flange 50 carries a tube 51 having a branch 52 through which the additional powdery material is supplied to the device. The homogenizing device is preferably mounted so that the branch 52 is directed upwards and the powder put therein goes automatically to the tube 51. A hollow shaft 53 is rotatably mounted in the tube 51 and is provided on the outside with screw blades, so that a conveyor screw 54 is formed. The outer end of the shaft 53 extends from the tube 51 through a dust proof seal and a ball bearing 55, and carries a pulley 56. A bushing 57 is fixed to the other end of the shaft 53 by the blades of conveyor screw 54, and is supported in a bearing 58 near the flange 50. The bushing 57 carries a perforated basin-shaped disc 59 which is provided with pins 60 extending parallel to shaft 53 and only a few of which are shown in Fig. 3.

A round bar 61 extends axially through the hollow shaft 53 and, at the end of the latter carrying the pulley 56 the bar 61 protrudes from the shaft 53 and is enclosed slidingly, but held against rotation by a key 62, in a bushing 63 which is rigidly connected to the tube 51 by means of a bow 64. A wing nut 65 is screwed upon the protruding end of the bar 61. A helical spring 66 is placed between the bushing 63 and the nut 65.

The other extremity of the bar 61 also protrudes from the hollow shaft 53 and has an enlarged diameter portion 67 followed by a threaded smaller diameter portion 68. A perforated disc 69 is installed on the portion 68 and is secured against the enlarged diameter portion 67 by means of a nut 71. The side of the disc 69 facing toward the bushing 57 has helical grooves 70 formed in the peripheral portion thereof. When there is a certain strain in the spring 66, the edge portion of the disc 69 is urged adjacent against the bushing 57 with a corresponding pressure, so that the possibility of material penetrating into the tube 51 from the vessel is extremely small.

The pulley 56, and consequently also the shaft 53, is driven by means of a motor 72 rotating at a speed of, for example, 800 R. P. M. and carrying a pulley 73 by a belt (not shown) which runs around the pulleys 56 and 73. The direction of rotation is such that powder supplied through the branch 52 will be transported by the conveyor screw 54 to the disc 69. The grooves 70 are positioned to transport the powder radially outward therethrough in response to the relative movement of the disc 69 and the bushing 57. If necessary the slit between the disc 69 and the bushing 57 may be enlarged by adjusting the nut 65 to reduce the force applied by spring 66. The powder introduced into the vessel of the mixing device in this way is immediately finely spread through a large mass of material by means of the disc 59 with the pins 60, so that the powder is quickly spread homogeneously throughout the entire contents of the vessel if the homogenizer 59 as well as the mixing member in the vessel move at the required speed.

If desired, the helical grooves 70 may be eliminated or replaced by grooves in the form of non-radial straight lines. Further, the corresponding edge of the bushing 57 may also be provided with grooves. The grooves of the disc 69 and bushing 57 may be provided in such a way, that they have a grinding action which is important when a coloring substance is supplied. Small grains in the pigment are pulverized just before mixing with the large quantitly of material in the vessel. Thus, variations in color are avoided that would result from a later crushing of an originally unpulverized particle of pigment.

At the same time that the solid substance is supplied a gas may also be supplied, if necessary. Finally, the screw blades of the screw 54 may be omitted at certain places along the shaft 53 or they may be replaced by scoops or other conveying elements.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What I claim is:

1. A mixing device for homogenizing powdery and granular materials comprising a mixing vessel for containing the materials to be homogenized and having a wall, at least one mixing member in said vessel operative to carry the materials in the vessel in a stream along said wall, a hollow shaft extending, at one end, through said wall into said vessel, a motor outside of said vessel and coupled to said shaft for rotating the latter at high speed, a disc-shaped homogenizing member mounted on said one end of the shaft within said vessel and having projections thereon, at least a plurality of said projections extending from said disc-shaped member parallel to said one end of the shaft in the direction away from said wall, a non-rotatable tube extending axially through said shaft to define a longitudinal channel in the latter and having an aperture opening from said channel at the side of said homogenizing member facing away from said wall, means for supplying a substance to be added to the materials in the vessel to said channel from a source of such substance located outside of said vessel, and two relatively rotatable parts defining a radially opening annular gap therebetween at the side of said homogenizing member facing away from said wall and communicating with said aperture to receive the substance supplied to said channel, one of said parts being fixed to said homogenizing member for rotation with the latter and the other of said parts being fixed to said non-rotatable tube, said two parts having diameters substantially less than that of said disc-shaped homogenizing member so that the substance supplied to said longitudinal channel is discharged through said annular gap into the operating region of said projections on the homogenizing member.

2. A mixing device as in claim 1; wherein said hollow shaft is movable axially to a limited extent relative to said non-rotatable tube for varying the thickness of said annular gap; and further comprising spring means acting axially on said hollow shaft to urge the latter in the direction moving said part fixed to the homogenizing member toward said other part fixed to the tube, thereby to close said gap so that the latter is opened only when the substance supplied to said channel is under a pressure sufficient to overcome the action of said spring means.

3. A mixing device for homogenizing powdery and granular materials comprising a vessel for containing the materials to be homogenized and having a frusto-conical side wall which tapers downwardly, at least one rotatable mixing member in said vessel with its axis extending generally parallel to said side wall, means supporting and driving said mixing member for rotation about its own axis and for bodily movement around the central axis of said side wall of the vessel, said mixing member being operative, when driven, to carry the materials within said vessel in a stream along said side wall from the relatively narrow bottom to the relatively wide top of said vessel, said side wall having an opening therein adjacent said bottom of the vessel, a driving shaft extending, at one end, into said vessel through said opening in the side wall, means rotatably supporting said driving shaft relative to said wall, means rotatably driving said shaft, a disc-shaped homogenizing member mounted on said one end of said shaft within the vessel to rotate with said shaft, and projections extending from said homogenizing member substantially parallel to said shaft, at least a plurality of said projections extending from said homogenizing member in the direction away from said side wall.

References Cited in the file of this patent

UNITED STATES PATENTS

| | | |
|---|---|---|
| 35,110 | Pierce | Apr. 29, 1862 |
| 1,269,399 | Davis | June 11, 1918 |
| 2,345,063 | Nauta | Mar. 28, 1944 |
| 2,639,901 | Teale | May 26, 1953 |